(12) United States Patent
Feenstra et al.

(10) Patent No.: US 9,449,563 B2
(45) Date of Patent: Sep. 20, 2016

(54) THREE-PHASE LINE CONTROL IN A DISPLAY APPARATUS

(71) Applicant: Liquavista B.V., Seattle, WA (US)

(72) Inventors: Bokke Johannes Feenstra, Eindhoven (NL); Romaric Mathieu Massard, Eindhoven (NL)

(73) Assignee: Amazon Technologies, Inc., Seattle, WA (US)

( * ) Notice: Subject to any disclaimer, the term of this patent is extended or adjusted under 35 U.S.C. 154(b) by 145 days.

(21) Appl. No.: 14/251,158

(22) Filed: Apr. 11, 2014

(65) Prior Publication Data

US 2014/0218351 A1    Aug. 7, 2014

Related U.S. Application Data

(63) Continuation of application No. PCT/EP2012/069731, filed on Oct. 5, 2012.

(30) Foreign Application Priority Data

Oct. 11, 2011    (GB) .................................. 1117556.9

(51) Int. Cl.
| | |
|---|---|
| G02B 26/02 | (2006.01) |
| G09G 3/36 | (2006.01) |
| G09G 3/34 | (2006.01) |
| G02B 26/00 | (2006.01) |
| G09G 3/20 | (2006.01) |

(52) U.S. Cl.
CPC ............... *G09G 3/36* (2013.01); *G02B 26/005* (2013.01); *G09G 3/348* (2013.01); *G09G 3/2011* (2013.01); *G09G 2310/0289* (2013.01)

(58) Field of Classification Search
CPC .. G09G 3/348; G09G 3/3433; G02B 26/005; G02B 26/004
See application file for complete search history.

(56) References Cited

U.S. PATENT DOCUMENTS

| | | | |
|---|---|---|---|
| 6,449,081 B1 | 9/2002 | Onuki et al. | |
| 2005/0104647 A1 | 5/2005 | Choi et al. | |
| 2007/0075941 A1 | 4/2007 | Zhou et al. | |
| 2009/0027317 A1 | 1/2009 | Cheng et al. | |
| 2009/0284824 A1* | 11/2009 | Feenstra ............... | G02B 26/004 359/291 |
| 2010/0302615 A1 | 12/2010 | Aubert et al. | |
| 2011/0032276 A1 | 2/2011 | Chen et al. | |
| 2013/0222355 A1* | 8/2013 | Choi ..................... | G09G 3/348 345/211 |

FOREIGN PATENT DOCUMENTS

| | | | |
|---|---|---|---|
| JP | 200618299 A | 1/2006 | |
| JP | 2007511782 A | 5/2007 | |
| JP | 2010152317 A | 7/2010 | |
| TW | 200840173 A | 10/2008 | |
| TW | 200935088 A | 8/2009 | |

(Continued)

*Primary Examiner* — Larry Sternbane
*Assistant Examiner* — Sepehr Azari
(74) *Attorney, Agent, or Firm* — EIP US LLP

(57) ABSTRACT

A display apparatus includes an electrowetting display device having at least one picture element with a display area. The display area has an active area and a different, inactive area and a display controller controls a display effect of the picture element in a range between a dark state and a light state, with a three-phase line between a first fluid, a second fluid and a first support plate of the picture element being completely in the inactive area for a first applied voltage corresponding to the dark state.

26 Claims, 4 Drawing Sheets

(56) References Cited

FOREIGN PATENT DOCUMENTS

| WO | 2006/017129 | A2 | 2/2006 |
| WO | 2006/021912 | A1 | 3/2006 |
| WO | 2007/141218 | A1 | 12/2007 |
| WO | 2007/141220 | A1 | 12/2007 |
| WO | 2008/119774 | A1 | 10/2008 |
| WO | 2009/071676 | A1 | 6/2009 |
| WO | 2009/071694 | A2 | 6/2009 |
| WO | 2009/156431 | A1 | 12/2009 |
| WO | 2011/051413 | A1 | 5/2011 |
| WO | 2011/157818 | A1 | 12/2011 |

* cited by examiner

THREE-PHASE LINE CONTROL IN A DISPLAY APPARATUS

CROSS REFERENCE TO RELATED APPLICATIONS

This application is a continuation under 35 U.S.C. §120 of PCT Application No. PCT/EP2012/069731 filed Oct. 5, 2012.

BACKGROUND

Known electrowetting display devices have a plurality of picture elements, each picture element including a first and an immiscible second fluid. When no voltage is applied to a picture element, the first fluid forms a layer on a display area of the picture element. Application of a voltage causes the second fluid to adjoin the display area by displacing the first fluid. An increase of the voltage increases the area adjoined by the second fluid and produces a display effect. The hysteresis in the display effect is reduced by maintaining at least a minimum area in contact with the second fluid during operation of the display device, e.g. by keeping the voltage on the picture element above a minimum value. The minimum area of the display area is made absorbing for radiation to improve the contrast ratio of the picture element.

It is desirable to improve the contrast ratio of the picture element.

DETAILED DESCRIPTION

Figure 1:
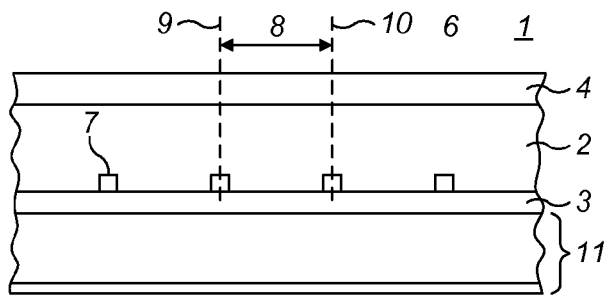
FIG. 1 shows a cross-section of an electrowetting display device.

The entire contents of the following patent documents are incorporated by reference herein:
1. GB 1117556.9 filed Oct. 11, 2011
2. PCT/EP2012/069731 filed Oct. 5, 2012

Embodiments described herein relate to a display apparatus including a display device and a method of operating a display device.

Before describing detailed embodiments referencing the Figures, embodiments will be described in summary form.

In accordance with first embodiments, there is provided a display apparatus including an electrowetting display device and a display controller;
the display device comprising at least one picture element having a first support plate,
a second support plate, a space between the first support plate and the second support plate, and a display area in the plane of the first support plate, the display area having an active area and a different, inactive area,
the space including a first fluid and a second fluid immiscible with each other, a position of the first fluid being controllable by a voltage applied to the picture element for creating a display effect, at zero applied voltage the first fluid forming a layer covering the active area and the inactive area, and at a higher applied voltage the first fluid, the second fluid and the first support plate forming a three-phase line,
the display controller comprising an input for image data representing an image to be displayed and an output for controlling the display effect of the picture element in a range between a dark state and a light state,
wherein the three-phase line is completely in the inactive area for a first applied voltage corresponding to the dark state of the output.

The embodiments apply to a picture element in which the display area has an active area and an inactive area. The active area contributes to the display effect of the picture element, which may be a change in reflection of light incident from the viewing side of the display device or a change in transmission of light from a backlight arranged at the rear side of the display device. The inactive area does not contribute to the display effect of the picture element, e.g. because it is opaque or absorbs light. On application of a voltage to the picture element, the motion of the first fluid initiates in the inactive area.

The embodiments are based on the discovery that the display effect for the picture element has a darkest display state at a non-zero applied voltage. In this darkest display state the three-phase line is completely in the inactive area. When the voltage is increased from this darkest display state, the display state will become lighter as the three-phase line moves over the inactive area towards the active area and subsequently onto the active area.

The display controller controls the display effect and thereby the display state of the picture element in a range between a dark state and a light state. The controller is arranged such that the dark state of the range corresponds to a first voltage applied to the picture element where the three-phase line is completely in the inactive area. This first voltage will result in a display state of the picture element equal to or close to said darkest display state. In a known display device the dark state corresponds to an applied voltage where the three-phase line is not in the inactive area but on the border between the inactive area and the active area. This display state in the known display device is lighter than the dark state according to the embodiments. Hence, the increased darkness of the dark state of the display device controlled according to the embodiments compared to that of the known display device causes a higher contrast.

Use of the embodiments allows the reduction in the thickness of the layer of first fluid of a known display device that already has sufficient contrast, thereby reducing the voltage required to control the position of the first fluid. The embodiments also allow the use of a first fluid having a lower absorption than common in known display devices. Such first fluid may be used for example to reduce backflow. The lower absorption permits use of dyes that may exceed the solubility limit of the dye in the first fluid when used in a known display device.

The display states with applied voltages higher than the first applied voltage and with the three-phase line in the inactive area may be used as gray-scale states. The transmission of the picture element at these voltages is relatively low and well-controllable. States having such a low transmission are usually difficult to achieve in known display devices because the first fluid starts moving abruptly when increasing the voltage.

The display states with applied voltages lower than the first applied voltage and with the three-phase line in the inactive area may similarly be used as gray-scale states, these states also being well-controllable.

In an embodiment the active area and the inactive area adjoin along a border line, the border line having a shape similar to the three-phase line at an applied voltage where the three-phase line enters the active area. The increase in transmission from the darkest state when increasing the voltage is stronger if the shape of the three-phase line is similar to that of the border line; moreover, in this way the oil can be pushed as far as possible without having an opening on the transmissive part of the pixel, thereby optimizing the improvement in optical performance by the embodiment.

Alternatively, the border line may have a shape different from the shape of the three-phase line. The different shape will make the increase in transmission less strong, affecting the dark gray-scale states. The difference may be a difference in orientation of the two lines; the border line may also be undulating.

Other embodiments relate to a method of operating an electrowetting display device, the display device comprising at least one picture element having a first support plate, a second support plate, a space between the first support plate and the second support plate, and a display area in the plane of the first support plate, the display area having an active area and a different, inactive area, the space including a first fluid and a second fluid immiscible with each other, the method including the step of controlling a position of the first fluid by a voltage applied to the picture element for creating a display effect, at zero applied voltage the first fluid forming a layer covering the active area and the inactive area, and at a higher applied voltage the first fluid, the second fluid and the first support plate forming a three-phase line, wherein the three-phase line is completely in the inactive area for a first applied voltage corresponding to a dark state of an image to be displayed.

Embodiments also relate to use of the above display device or method for improving the contrast of the display.

Embodiments will now be described in detail.

FIG. 1 shows a cross-section of an electrowetting display device 1 of the transmissive type. The display device includes a space 2 between a first support plate 3 and a second support plate 4. The first support plate 3 faces a rear side 5 and the second support plate 4 faces a viewing side 6 for viewing an image displayed on the display device. In an alternative embodiment the viewing side and the rear side are reversed. A plurality of walls 7, forming part of the first support plate 3, separate the space 2 into a plurality of picture elements or pixels. Although the walls are shown as protrusions of the first support plate, they may also be level areas of the first support plate, which could be made e.g. hydrophilic. The extent of a pixel 8 is determined by lines 9, 10 passing through the centres of the walls 7.

When the display device is of the reflective type, a reflector may be included in the first support plate 3 to reflect light incident from the viewing side 6. In the alternative embodiment with the viewing side and rear side reversed, the reflector may be included in the second support plate 4.

When the display device is transmissive, an illuminating unit or backlight unit 11 may be provided at the rear side of the first support plate 3. In the alternative embodiment the backlight unit may be provided on the second support plate 4. The pixel 8 acts as a light valve for the passage of light from the illuminating unit to the viewing side. The illumination unit may comprise a single white light source; it may also comprise a plurality of colour light sources for spectrum sequential operation of the display. The illuminating unit may have any form; it may also be absent, in which case the transmissive display device operates with ambient light incident from the rear side.

Figure 2A:
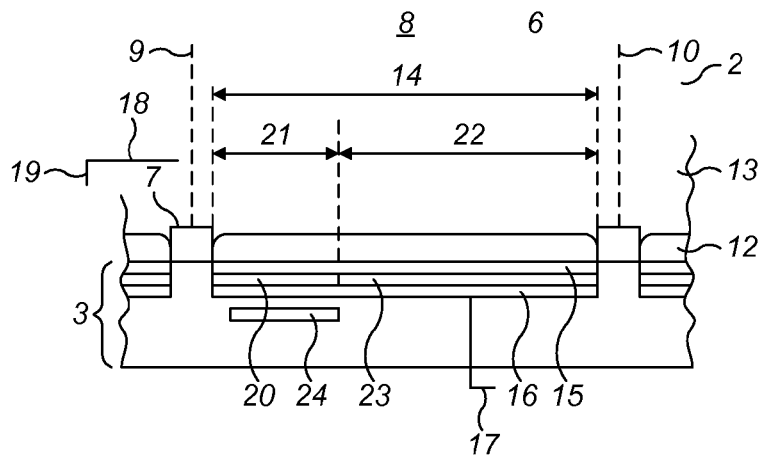
FIG. 2(a) shows a cross-section of a pixel.

FIG. 2(a) shows a cross-section of the pixel 8 and the first support plate 3. The space 2 between the two support plates includes a first fluid 12 and a second fluid 13 immiscible with the first fluid. The first fluid absorbs at least a part of the optical spectrum of the backlight or the ambient light. When part of the optical spectrum is absorbed, the pixel operates as a switchable colour filter. When the complete optical spectrum is absorbed, the pixel operates as a switchable grey-state filter. The first fluid may for example be an alkane like hexadecane or (silicone) oil. The second fluid 13 is electrically conductive or polar and usually transparent for said part of the optical spectrum. The second fluid may be a water or salt solution such as a solution of KCl in a mixture of water and ethyl alcohol. The lateral extent of the first fluid 12 is limited by the walls 7. A display area 14 is the area of the first support plate between the walls of a pixel, i.e. the area in the Figure covered by the first fluid 12. The first support plate 3 includes a hydrophobic layer 15 which is more wettable for the first fluid than for the second fluid. The first support plate 3 includes an electrode 16, electrically insulated from the space 2 and connected to a signal line 17. A common electrode 18 is in contact with the second fluid 13 and is connected to a signal line 19. A display voltage output from a driver stage (not shown in the Figure) is applied between the electrodes via the signal lines 17 and 19. The position of the first and second fluid within the display element depends on the voltage applied to the electrodes, which position determines a display effect of the pixel. Details of the construction and operation of the pixel have been disclosed in FIG. 1 and the relating part of the description of international patent application WO2008/119774.

The first support plate 3 includes an absorbing layer 20 for absorbing ambient light incident from the viewing side 6 or backlight from the rear side. The absorbing layer may be arranged above the transparent electrode 16. Alternatively, it may be formed as part of the electrode 16 or be located below the transparent electrode 16. Absorbing layer 20 may be made of black polymer or a material comprising carbon particles or a black dye. The absorbing layer 20 extends over only part of the display area 14. Hence, due to the absorbing layer 20 the display area 14 includes an inactive area 21 and an active area 22. The active area contributes to the display effect, the inactive area does not. A transparent layer 23 may be arranged in the active area 22, adjoining the absorbing layer 20; however, the layer 23 may also be absent.

In a transmissive display device the first support plate 3 is transparent over the active area 22 for the backlight. A reflector may be arranged in the inactive area 21 for reflecting light from the backlight back into itself, thereby increasing the efficiency of the illumination unit.

In a reflective display device the first support plate 3 need not be transparent and may be provided with a reflective layer with the viewing side 6 as shown in FIG. 1. In the reverse configuration, with the viewing side on the side of the first support plate 3, the first support plate should be transparent.

Figure 2B:
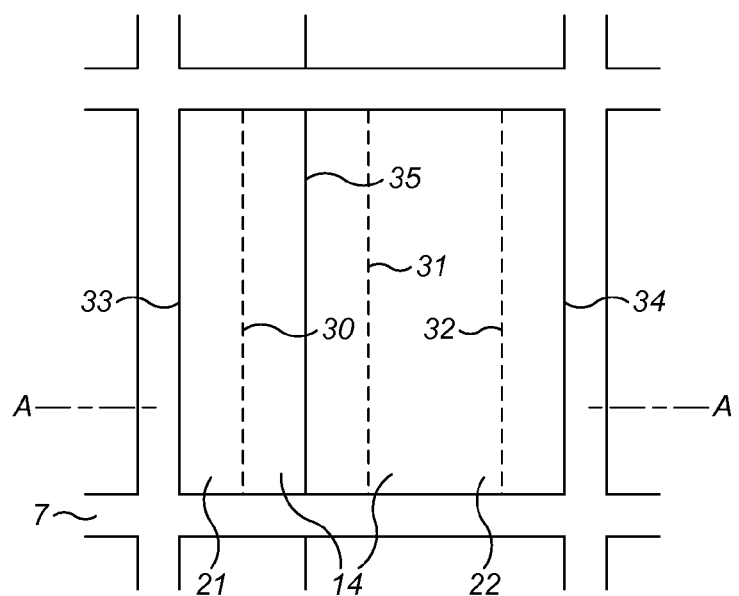
FIG. 2(b) shows a plan view of the pixel.

FIG. 2(b) shows a plan view of the pixel 8 with the display area 14 bordering the walls 7, the display area 14 including the inactive area 21 and the active area 22. The cross-section of FIG. 2(a) is taken along the line A-A in FIG. 2(b).

Electronic components of the pixel, such as signal lines and thin-film transistors (TFTs) for controlling the voltage applied to the pixel, for example in a transmissive display device which may be of the active-matrix type, may be arranged in the inactive area 21 of the first support plate 3 to avoid them affecting the transmission in the active area 22. The electronic components are schematically shown as element 24 in FIG. 2(a). It allows the active area to be used in an efficient way, leading to improved optical performance of the pixel.

In the zero volt state, when the first fluid 12 covers both the inactive area and the active area, there may be some transmission of backlight or reflection of ambient light due to the limited absorption of the layer of first fluid. Embodiments permit a reduction of this transmission without increasing the thickness of the layer of first fluid at zero volt and without increasing the absorption per unit length of the first fluid.

Figure 3:
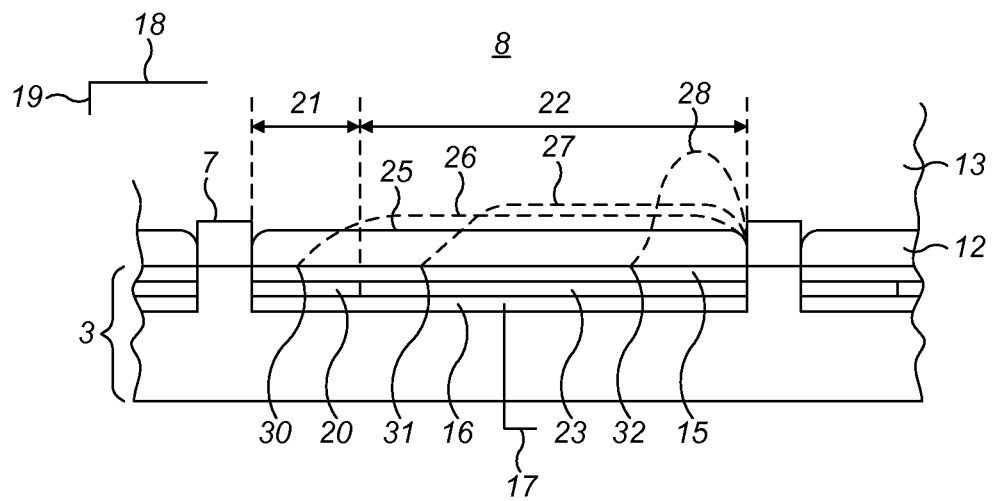
FIG. 3 shows a cross-section of the pixel.

FIG. 3 shows the same cross-section as FIG. 2(a), now including the position of the first fluid 12 for four different voltages applied between the electrodes 16 and 18. The drawn line 25 is the interface between the first fluid 12 and the second fluid 13 when a zero voltage is applied and the first fluid forms a layer covering the inactive area 21 and the active area 22. At a voltage Va the first fluid 12 contracts to the right in the Figure and the interface assumes the form indicated by the dashed line 26. At a higher voltage Vb the first fluid has contracted further, resulting in an interface shown by the dashed line 27. At a high operating voltage Vc of the display device the first fluid is fully contracted and the interface has the shape of the dashed line 28. The pixel is in the light state at voltage Vc. The part of the display area 14 covered by the fully contracted first fluid need not be transparent and may be made absorbing for ambient light.

Figure 4:
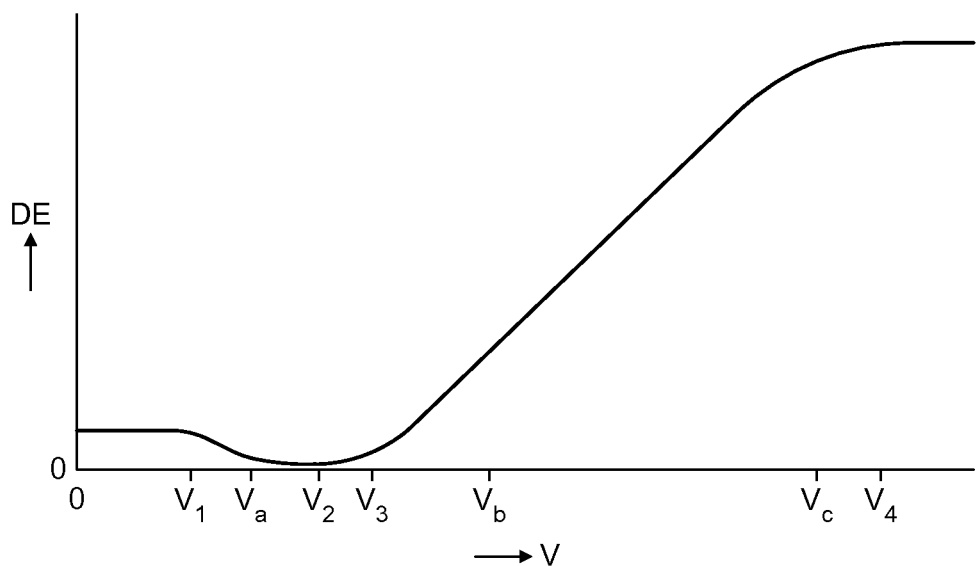
FIG. 4 shows a transmission versus voltage graph.

When the second fluid is in contact with the hydrophobic layer 15, the first fluid 12, the second fluid 13 and the first support plate 3 form a three-phase line, shown in FIGS. 2(b) and 3 for applied voltages Va, Vb and Vc as element 30, 31 and 32, respectively. FIG. 4 shows the display effect DE of the pixel 8 as a function of the applied voltage V. The display effect is the transmittance or reflectance of the pixel for a transmissive or reflective display device, respectively.

At zero applied voltage the first fluid 12 forms a layer covering the display area 14, as shown by interface 25 in FIG. 3, and the display effect has a value as shown in FIG. 4 for V=0. When the voltage is increased from zero to a so-called threshold voltage, the second fluid 13 will contact the hydrophobic layer 15 and form the three-phase line. The three-phase line will move from an edge 33 of the display area 14 towards an opposite edge 34, shown in FIG. 2(b).

When the three-phase line 30 moves towards the edge 34, the height of the first fluid 12 above the hydrophobic layer 15 in the active area 22 increases, as shown by the interfaces 25 and 26. Hence, the absorption of light by the first fluid over the active area increases and thus the display effect decreases. Hence, at an increasing voltage the display effect decreases. This decrease occurs for voltages in a first range from V1 and V2, as shown in FIG. 4. In the first range the three-phase line is completely in the inactive area 21. V1 is close to the voltage where the three-phase line has just formed, i.e. the threshold voltage; V2 is the voltage where the decrease of the transmission ends. The pixel is in its darkest state at the voltage V2. Since the inactive area 21 absorbs incident ambient light, the part of the display area exposed by the contracting first fluid 12 does not reflect the ambient light and does therefore not deteriorate the contrast of the pixel.

The effect of the increasing height of the layer of fluid 12 for applied voltages in the first range on the transmission of the pixel can be clarified by the following example. In an embodiment the height of the layer at zero volt is 4 micrometer and the transmission is 3%; at a high operating voltage Vc the transmission is 30%; the contrast is thus 30/3=10. When the inactive area 21 occupies 30% of the display area 14, the height of the oil in the active area will increase from 4 to 6 micrometer when the three-phase line approaches the active area. The transmission decreases from 3% to 0.5% and the contrast enhances from 10 to 60.

The inactive area 21 may be at least 20% of the display area 14 to attain an increase of the height of the first fluid layer, the percentage depending on material properties. The percentage may also be about 50% when the electronic components for controlling the voltage on the electrode require a substantial amount of space in the first support plate 3, for instance in high resolution displays. The inactive area may also be larger than the part of the display area uncovered when the threshold voltage is exceeded for the first time when starting from zero volt. The initial decrease in transmission to the dark state when increasing the voltage from V1 to V2 is larger if the shape of the three-phase line is similar to that of the border line between the inactive area and the active area.

The relatively low transmission in the first range from V1 to V2 can be used for dark grey scales. These dark grey scales are more stable than in known display devices, where the dark grey scales are formed near the threshold voltage, where hysteresis may affect the display effect. In the present embodiments the dark grey levels can be formed at voltages higher than the threshold voltage.

At voltages higher than V2 the three-phase line comes so close to the border line 35 of the inactive area 21 and the active area 22 that the height of the first fluid in the active area close to the border line decreases, causing an increase of the transmission through the first fluid. At a voltage V3 the three-phase line is on the border line 35. At higher voltages the first fluid 12 will clear part of the active area 22 and light can transmit from the illumination unit through this part to the viewing side 6 or can be reflected from the viewing side back to the viewing side. The display effect increases at higher voltages, forming intermediate grey states. The three-phase line is at least partly on the active area 22 when the applied voltage is in a second range from V3 to V4, V4 being the high operating voltage. The display effect increases for increasing applied voltages within the second range. At the voltage Vb within the second range the three-phase line in FIG. 2(b) is completely on the active area 22.

In an embodiment of the display device the first fluid has a predetermined direction of movement on an increasing applied voltage. When the direction of motion of the first fluid is well defined, the geometry of the inactive area and the active area can be more accurately designed. This direction of motion should be the same in a pixel over time and also between different pixels of a display device.

To this end the pixel is provided with a so-called initiator, which forces the first fluid to start moving in the same location of the pixel. The first fluid may contract in the same predetermined direction. When increasing the voltage from zero, the second fluid will contact the first support plate first at the initiator. The initiator may be a small strip in the inactive area 21 adjoining the edge 33 in FIG. 2, the strip having a lower wettability for the first fluid 12 than the other part of the display area 14, i.e. the strip is more hydrophilic. Alternatively, the electric field gradient over the layer of first fluid near the edge 33 may be increased by raising the height of the layer 15 and the electrode 16 near the edge 33, thereby decreasing the thickness of the layer of first fluid locally near the edge 16 at zero volt. The shape of the cross-section of a pixel may also cause the first fluid to contract in a predetermined direction, the shape acting as an initiator. Examples of initiators are disclosed in patent applications WO2006/021912, WO2007/141218 and WO2009/071676.

A preferential direction of contraction of the first fluid may also be obtained by arranging a collector in the pixel towards which the first fluid preferentially contracts. The collector may be an area near the edge 34, where the electric field gradient is lower, for example by removing a small strip of the electrode 16 near the edge 34 or arranging a strip electrode near the edge 34 having a lower voltage than the electrode 16. In a matrix display device the strip electrodes near the edge 34 of a plurality of pixels may be connected to the same voltage. The collector may also be an area where the thickness of the oil layer is increased, e.g. by a depression in the hydrophobic layer. Alternatively, the collector may be a part of the display area 14 that has been made more hydrophobic.

Figure 5:
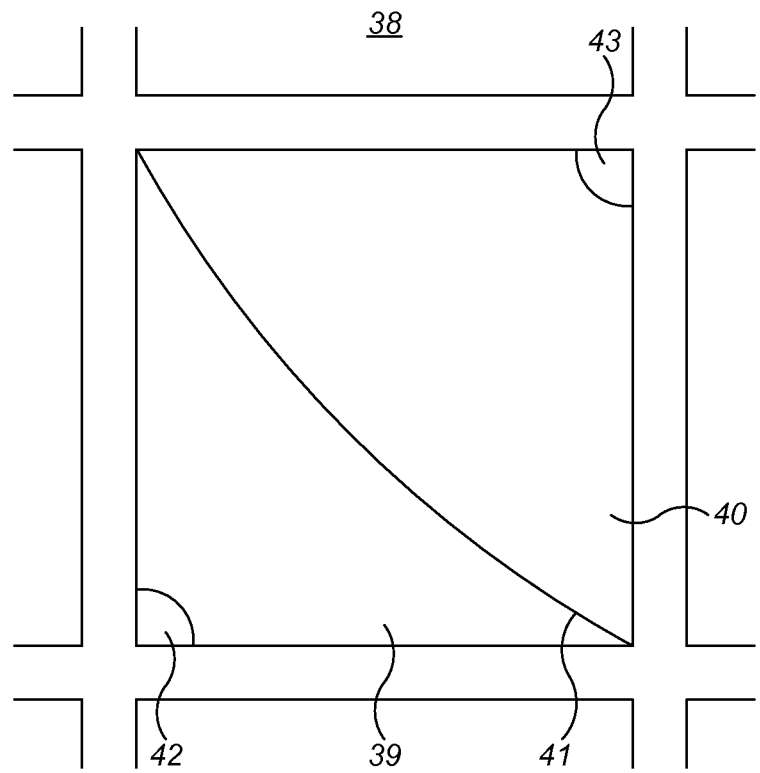
FIG. 5 shows a plan view of a pixel.

FIG. 5 shows a plan view of a pixel 38 having a different layout of the inactive area 39 and the active area 40 within the display area. A border line 41 between the inactive area and the active area is curved instead of straight as in FIG. 2. An initiator 42 is arranged in the inactive area and a collector 43 in the opposite corner of the pixel. At increasing voltage the first fluid 12 moves away from the initiator and contracts towards the collector. The border line 41 follows the shape of the three-phase line of the contracting first fluid when moving from the inactive area to the active area.

In an embodiment an electrode is arranged in the first support plate and the inactive area and the active area cover substantially the electrode. The motion of the first fluid can be controlled by a single electrode in the first support plate. The application of a voltage to the single electrode in an active matrix display device can be carried out in a known manner.

In an alternative embodiment a first electrode and a second electrode are arranged in the first support plate, the inactive area covering substantially the first electrode and the active area covering substantially the second electrode. An edge of the first electrode may border an edge of the second electrode; each of these edges may follow the shape of the border line 41. The use of two electrodes simplifies the positioning of the three-phase line at the border line between the inactive area and the active area, making it less dependent on variations in filling level of the first fluid and on the applied voltage.

Figure 6:
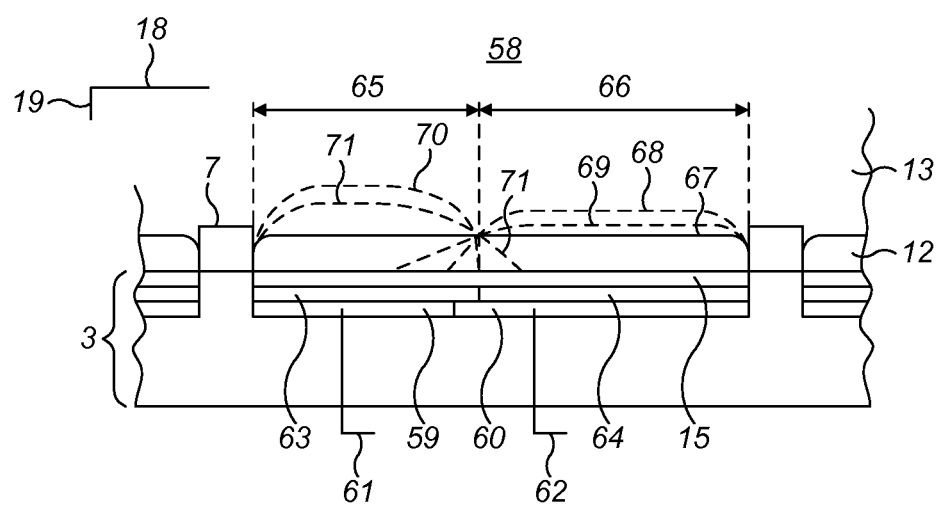
FIG. 6 shows a cross-section of a pixel.

FIG. 6 shows a cross-section of a pixel 58 having two electrodes 59 and 60 arranged in the first support plate 3 and independently controllable through signal lines 61 and 62, respectively. An absorbing layer 63, absorbing ambient light entering from the viewing side, has substantially the same extent in the display area as the electrode 59. A transparent layer 64 may be arranged adjacent to the absorbing layer 63. The display area is divided in an inactive area 65 defined by the absorbing layer 63 and an active area 66 defined by the transparent layer 64. Voltages are applied between electrode 59 and electrode 18 and between electrode 60 and electrode 18. The inactive area 65 is slightly larger than the electrode 59, as shown in the Figure, to achieve the minimum display effect when applying a voltage to only electrode 59.

When a zero voltage is applied to both electrodes 59 and 60, the first fluid 12 forms a layer of substantially uniform thickness covering the display area and having an interface 67 shown by the drawn line.

When zero volt is applied to the electrode 60 and a high voltage (near Vc) to the electrode 59, the interface assumes the shape of the dashed line 68, uncovering a substantial part of the inactive area 65 and increasing the height of the first fluid 12 in the active area 66, forming a dark state of the pixel 58. When the voltage on the electrode 59 is lowered, the interface changes to the dashed curve 69, reducing the height of the first fluid in the active area and forming dark grey states.

When zero volt is applied to the electrode 59 and a high voltage (near Vc) to the electrode 60, the interface assumes the shape of the dashed line 70, uncovering a substantial part of the active area 66 and forming a light state of the pixel 58. When the voltage on the electrode 60 is lowered, the interface changes to the dashed curve 71, covering a small part of the active area 66 and forming intermediate and light grey states.

If the pixel of FIG. 6 is used in an active matrix display device, the electrodes 59 and 60 may each be electrically connected to a TFT, each TFT being connected to its own gate line and both TFTs to a common source line. The TFTs may be arranged within the inactive area 65 of the first support plate 3 and/or within an area where the fully contracted first fluid is located. Alternatively, the electrodes 59 of several pixels can be connected together, allowing the display to be put into the dark state by applying a voltage to these electrodes.

Figure 7:
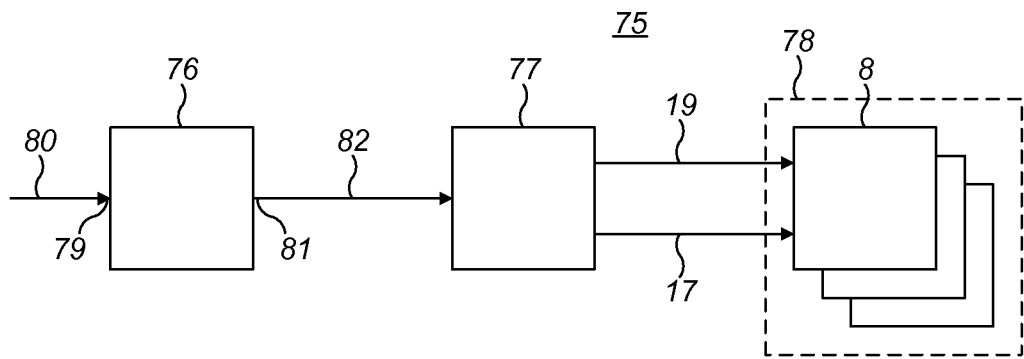
FIG. 7 shows a display apparatus.

FIG. 7 shows a display apparatus 75 including a display controller 76, a display driver 77 and a display device 78. The display controller 76 has an input 79 for image data 80 representing an image to be displayed, for example a still picture or a video stream. The image data may be digital or analog. The display controller processes the image data, controls any colour gamut of the display device, adds any control signals, and converts them to signals 82 at an output 81 for controlling the display effect of the one or more pixels of the display device 78 causing a display state within a range between a dark state and a light state. The display controller defines the dark state and the light state of an image to be displayed, the dark state and the light state being the end points of the range of gray-states of the image. The signals 82 are input to the display driver 77, which includes drivers for providing the voltages to be applied to the pixels and a possible latch. The output of the display driver for a pixel is connected to the signal lines 17 and 19 for applying the voltage to the electrodes 16 and 18 respectively of the pixel 8 (see also FIG. 2(a)). The display driver 77 may include a plurality of drivers and outputs.

Figure 8:
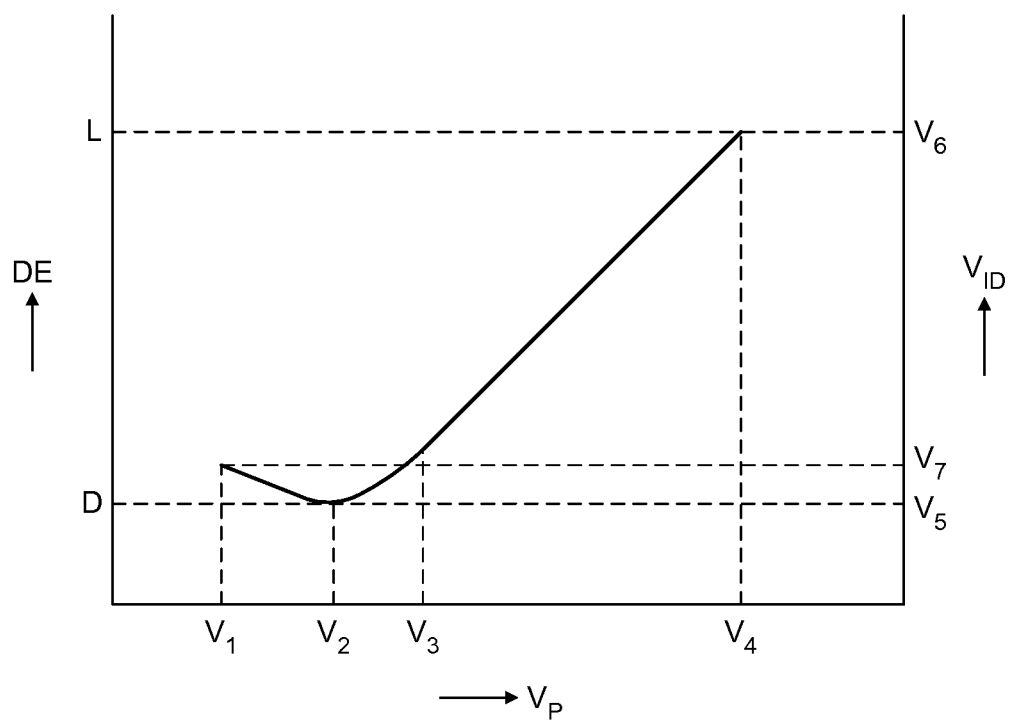
FIG. 8 shows a graph of the display effect versus the voltage of the image data.

FIG. 8 shows an example of a graph of the display effect DE and the voltage of the image data $V_{ID}$ representing the display state to be shown by a pixel of the display device versus the voltage Vp applied to the pixel. A voltage $V_{ID}$ between a minimum value V5 and a maximum value V6 can achieve any desired display effect DE in a range between a dark state D and a light state L. The output of the controller 76 controls, via the display driver 77, the voltage Vp applied to the pixel 8 over the signal lines 17 and 19, such that an image data voltage $V_{ID}$ between V5 and V6 correspond to an applied voltage Vp between V2 and V4. This is shown in FIG. 8 by the drawn line. When for example the voltage of the image data is V6, the high operating voltage V4 of the display device is applied to the pixel, and the pixel will be in the light state L.

In the embodiment shown in FIG. 8, V2 is the first applied voltage where the pixel is in the dark state D, the dark state D being the darkest state of the pixel, as explained above with reference to FIG. 4. In an alternative embodiment, V5 may correspond to a first applied voltage different from V2, provided this first applied voltage is lower than V3, where the three-phase line enters into the active area. The display state corresponding to V5 should be darker than the display state of V3. By using the applied voltage V2 or, alternatively another voltage higher than V1 and lower than V3 for the dark state of the picture element, the contrast between the dark and light state is increased compared to using the applied voltage V3 for the dark state D.

The dash-dot line in FIG. 8 shows how dark grey states can also be obtained by lowering the applied voltage Vp from V2 to V1 at increasing voltage $V_{ID}$. For image data voltages higher than V7 the conversion from $V_{ID}$ to Vp follows the drawn line.

Embodiments can achieve any grey state of the pixel between the dark and light state without using the zero-volt state where the first fluid forms a layer covering the display area. This allows operation at higher speeds, because the position of the fluids is mainly controlled by the applied voltages and to a lesser extent by the forces caused by the different wettability of the two fluids on the hydrophobic layer. Not using the zero volt state reduces the hysteresis of the transmission versus voltage graph, thereby improving the definition of the grey levels.

The above embodiments are to be understood as illustrative examples. Further embodiments are envisaged. For example, the border line between the inactive area and the active area may have a different shape from that of the three-phase line to achieve a slower increase of the transmission as a function of applied voltage and obtain more accurate grey levels. The location of the active area within the display area can be used to tune the contrast of the pixel. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the accompanying claims.

What is claimed is:

1. A display apparatus comprising an electrowetting display device and a display controller;
   the electrowetting display device comprising at least one picture element, the at least one picture element comprising a picture element having:
      a first support plate;
      a second support plate;
      a display area in a plane of the first support plate, the display area having an active area and a different, inactive area;
      a first fluid; and
      a second fluid immiscible with the first fluid, the first fluid and the second fluid located between the first support plate and the second support plate, a position of the first fluid being controllable by a voltage applied to the picture element for creating a display effect, at zero applied voltage the first fluid forming a layer covering the active area and the inactive area, and at a higher applied voltage the first fluid, the second fluid and the first support plate forming a three-phase line,
   the display controller comprising an input for image data representing at least part of an image to be displayed and an output for controlling the display effect of the picture element in a range between a dark state and a light state,
   wherein the three-phase line is completely in the inactive area with the higher applied voltage being a first applied voltage corresponding to the dark state of the output.

2. The display apparatus according to claim 1, wherein the display effect with the voltage applied to the picture element being higher than the first applied voltage and the three-phase line being completely in the inactive area is a gray-scale state.

3. The display apparatus according to claim 1, wherein the display effect with the voltage applied to the picture element being lower than the first applied voltage and the three-phase line being completely in the inactive area is a gray-scale state.

4. The display apparatus according to claim 1, wherein an electrode is arranged in the first support plate and the inactive area and the active area cover substantially the electrode.

5. The display apparatus according to claim 1, wherein a first electrode and a second electrode are arranged in the first support plate, the inactive area covering substantially the first electrode and the active area covering substantially the second electrode.

6. The display apparatus according to claim 1, wherein the first support plate comprises electronic components for controlling the voltage applied to the picture element, the electronic components being arranged in the inactive area.

7. The display apparatus according to claim 1, wherein the active area and the inactive area adjoin along a border line, the border line having a shape similar to the three-phase line with the voltage applied to the picture element being an applied voltage where the three-phase line enters the active area.

8. The display apparatus according to claim 1, wherein a transmission through the active area increases on increasing the voltage applied to the picture element above the first applied voltage.

9. The display apparatus according to claim 1, wherein the three-phase line is a line along which an interface between the first fluid and the second fluid adjoins the first support plate.

10. The display apparatus according to claim 1, wherein the three-phase line adjoins the first support plate, a position of adjoinment of the three-phase line with the first support plate depending on a configuration of the first fluid, the configuration of the first fluid depending on a magnitude of the higher applied voltage.

11. The display apparatus according to claim 1, wherein with the three-phase line being completely in the inactive area the three-phase line adjoins the inactive area of the display area without adjoining the active area of the display area.

12. The display apparatus according to claim 1, wherein each of the at least one picture element provides a respective display effect in dependence on a voltage applied respectively to each of the at least one picture element, the respective display effect of each of the at least one picture element together forming the at least part of the image.

13. The display apparatus according to claim 1, wherein the display effect is controllable in dependence on a thickness profile of the first fluid, the dark state corresponding with a dark state thickness profile of the first fluid with the three-phase line adjoining the inactive area without adjoining the active area.

14. The display apparatus according to claim 1, wherein the three-phase line at least partly adjoins the active area with the voltage applied to the picture element corresponding to the light state of the output and being higher than the first applied voltage.

15. The display apparatus according to claim 1, wherein the display effect is controllable in dependence on a thickness profile of the first fluid, the light state corresponding with a light state thickness profile of the first fluid with the three-phase line at least partly adjoining the active area.

16. The display apparatus according to claim 1, wherein the first support plate comprises one or more of: an absorbing layer for absorbing incident light, the inactive area covering substantially the absorbing layer; or a reflector for reflecting incident light, the inactive area covering substantially the reflector.

17. The display apparatus according to claim 1, wherein the picture element comprises an initiator located in the picture element to determine a location where the first fluid starts moving with the voltage applied to the picture element, having a magnitude higher than zero volts, first applied to the picture element after the zero applied voltage is applied to the picture element.

18. The display apparatus according to claim 1, wherein the inactive area is one or more of: at least about 20% of the display area, about 50% of the display area, or larger than a part of the display area uncovered by the first fluid with the voltage applied to the picture element, increasing from zero volts, first exceeding a threshold voltage at which the three-phase line is formed.

19. A method of operating an electrowetting display device comprising at least one picture element, the at least one picture element comprising a picture element,
the method comprising:
applying a voltage to the picture element to control a position of a first fluid for creating a display effect, the picture element having a first support plate, a second support plate, the first fluid, a second fluid immiscible with the first fluid, the first fluid and the second fluid located between the first support plate and the second support plate, and a display area in the plane of the first support plate, the display area having an active area and a different, inactive area,
at zero applied voltage the first fluid forming a layer covering the active area and the inactive area, and at a higher applied voltage the first fluid, the second fluid and the first support plate forming a three-phase line, wherein the three-phase line is completely in the inactive area with the higher applied voltage being a first applied voltage corresponding to a dark state of the display effect.

20. The method according to claim 19, wherein the voltage is higher than the first applied voltage such that the three-phase line is completely in the inactive area, the display effect being a gray-scale state.

21. The method according to claim 19, wherein the voltage is lower than the first applied voltage such that the three-phase line is completely in the inactive area, the display effect being a gray-scale state.

22. The method according to claim 19, comprising increasing the voltage above the first applied voltage to increase a transmission through the active area.

23. A display controller comprising an input for image data representing at least part of an image to be displayed and an output for controlling a display effect of a picture element in a range between a dark state and a light state, the display controller being configured to perform a method of operating an electrowetting display device comprising at least one picture element, the at least one picture element comprising the picture element,
the method comprising:
applying a voltage to the picture element to control a position of a first fluid and creating a display effect, the picture element having a first support plate, a second support plate, the first fluid, a space second fluid immiscible with the first fluid, the first fluid and the second fluid located between the first support plate and the second support plate, and a display area in the plane of the first support plate, the display area having an active area and a different, inactive area,
at zero applied voltage the first fluid forming a layer covering the active area and the inactive area, and at a higher applied voltage the first fluid, the second fluid and the first support plate forming a three-phase line, wherein the three-phase line is completely in the inactive area with the higher applied voltage being a first applied voltage corresponding to a dark state of the output.

24. The display controller according to claim 23, wherein the voltage is higher than the first applied voltage such that the three-phase line is completely in the inactive area, the display effect being a gray-scale state.

25. The display controller according to claim 23, wherein the voltage is lower than the first applied voltage such that the three-phase line is completely in the inactive area, the display effect being a gray-scale state.

26. The display controller according to claim 23, comprising increasing the voltage above the first applied voltage to increase a transmission through the active area.

* * * * *